(12) United States Patent
Evans et al.

(10) Patent No.: US 8,606,948 B2
(45) Date of Patent: Dec. 10, 2013

(54) CLOUD-BASED DEVICE INTERACTION

(75) Inventors: Ethan Z. Evans, Snoqualmie, WA (US);
Luis Felipe Cabrera, Bellevue, WA (US); Hilliard Bruce Siegel, Seattle, WA (US); Peter N. DeSantis, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 493 days.

(21) Appl. No.: 12/889,888

(22) Filed: Sep. 24, 2010

(65) Prior Publication Data

US 2012/0079126 A1    Mar. 29, 2012

(51) Int. Cl.
    *G06F 15/16*    (2006.01)
(52) U.S. Cl.
    USPC .......................................................... 709/230
(58) Field of Classification Search
    USPC .......................................................... 709/230
    See application file for complete search history.

(56) References Cited

U.S. PATENT DOCUMENTS

| | | | |
|---|---|---|---|
| 7,343,414 | B2 | 3/2008 | Lipscomb et al. |
| 7,769,895 | B1 | 8/2010 | Williams et al. |
| 2002/0007418 | A1 | 1/2002 | Hegde et al. |
| 2006/0015580 | A1 | 1/2006 | Gabriel et al. |
| 2006/0161635 | A1 | 7/2006 | Lamkin et al. |
| 2006/0256130 | A1 | 11/2006 | Gonzalez |
| 2007/0204300 | A1 | 8/2007 | Markley et al. |
| 2007/0226365 | A1 | 9/2007 | Hildreth et al. |
| 2007/0233819 | A1 | 10/2007 | Sato |
| 2007/0266416 | A1 | 11/2007 | Cheng et al. |
| 2007/0268509 | A1* | 11/2007 | Andreoli et al. ............. 358/1.14 |
| 2009/0179754 | A1 | 7/2009 | Burchard et al. |
| 2009/0259711 | A1 | 10/2009 | Drieu et al. |
| 2009/0264103 | A1 | 10/2009 | Chen et al. |
| 2010/0042747 | A1 | 2/2010 | Hascalovici et al. |
| 2010/0146146 | A1 | 6/2010 | Welts et al. |
| 2010/0223407 | A1 | 9/2010 | Dong et al. |

(Continued)

OTHER PUBLICATIONS

International Search Report and Written Opinion mailed Feb. 9, 2012 in Application No. PCT/US2011/52640 filed Sep. 21, 2011, 11 pages.

(Continued)

*Primary Examiner* — Lynn Feild
*Assistant Examiner* — Bryan Lee
(74) *Attorney, Agent, or Firm* — Kilpatrick Townsend & Stockton LLP

(57) ABSTRACT

A logically centralized system or service, such as a cloud-based content management service, enables intelligent communication between disparate devices. Such communication enables content such as applications and data to be synchronized between various devices, where the synchronization takes into account the capabilities of each device to provide versions and/or formats of that content that are appropriate for each device. A user purchasing an additional device, for example, can have various applications and other content automatically installed or copied over to the additional device, but with versions or formats that take advantage of, and are appropriate for, the capabilities of that additional device. Further, the intelligent communication via a logically centralized service can enable such devices to interact even though those devices might utilize different protocols and/or formats, and might otherwise not be able to communicate or have ever have been tested together.

20 Claims, 7 Drawing Sheets

(56) References Cited

U.S. PATENT DOCUMENTS

| | | | |
|---|---|---|---|
| 2010/0325086 A1* | 12/2010 | Skinner et al. | 707/609 |
| 2011/0145926 A1* | 6/2011 | Dalcher et al. | 726/26 |
| 2011/0222549 A1 | 9/2011 | Connelly et al. | |
| 2011/0235090 A1* | 9/2011 | Salgado | 358/1.15 |
| 2011/0252082 A1 | 10/2011 | Cobb et al. | |
| 2011/0299110 A1* | 12/2011 | Jazayeri et al. | 358/1.15 |
| 2012/0078997 A1 | 3/2012 | Evans et al. | |
| 2012/0079095 A1 | 3/2012 | Evans et al. | |
| 2012/0079276 A1 | 3/2012 | Evans et al. | |
| 2012/0166603 A1* | 6/2012 | Jain et al. | 709/222 |
| 2012/0197998 A1 | 8/2012 | Kessel et al. | |

OTHER PUBLICATIONS

U.S. Appl. No. 12/889,918, "Final Office Action", mailed Apr. 22, 2013.

U.S. Appl. No. 12/890,314, "Final Office Action", mailed Apr. 30, 2013.

Final Office Action mailed Mar. 21, 2013 in U.S. Appl. No. 12/889,962, filed Sep. 24, 2010.

2 Kindles—Same Account—Reading the same book, Post at MobileRead Forums, Aug. 2007; 6 pages.

Sharing Two Kindles, How does it work?, Internet article by Mike West, Mar. 22, 2008; 14 pages.

* cited by examiner

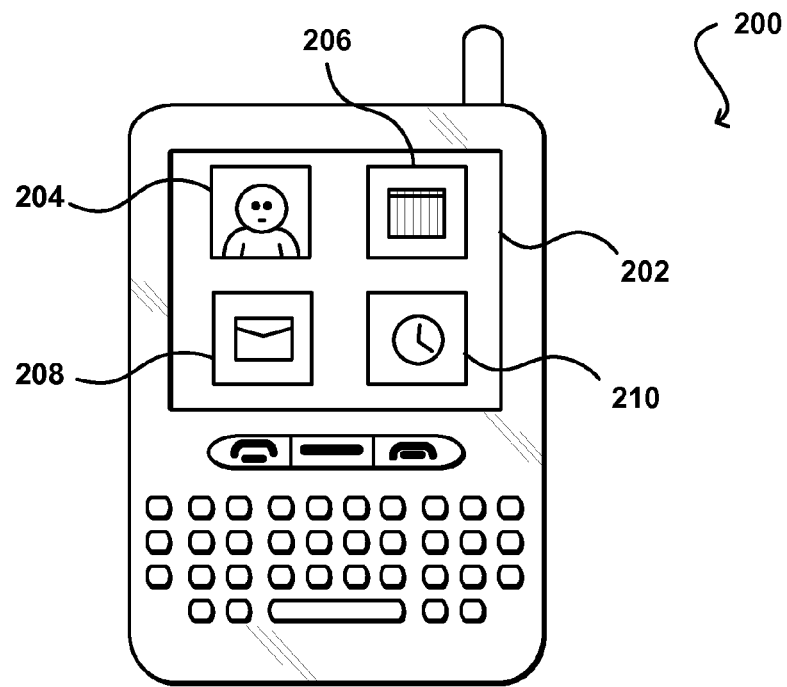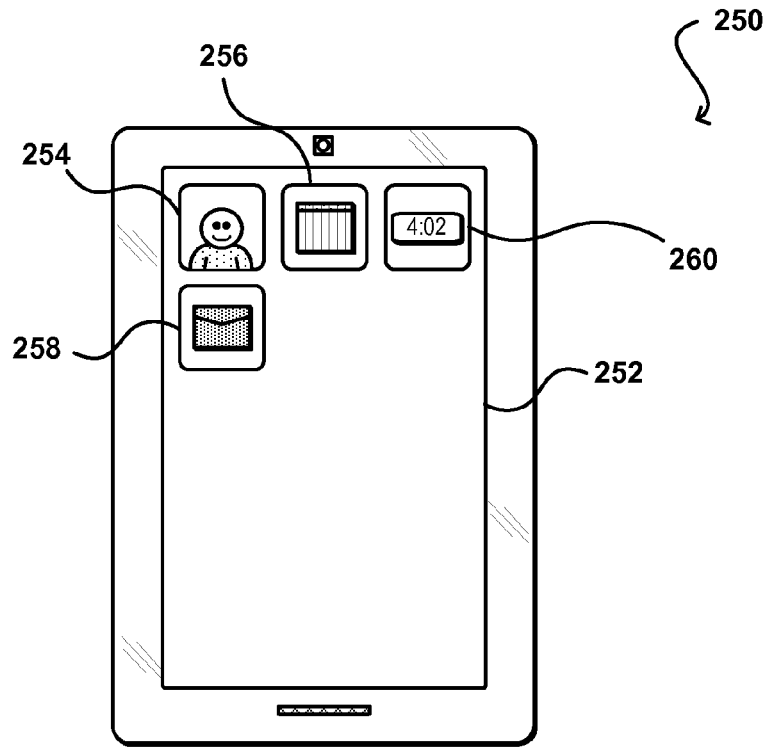
FIG. 2

| ID | Audio | Video | Processor | RAM | Resolution | ..... |
|---|---|---|---|---|---|---|
| SX3df | Stereo | HD | 3.0GHz | 4GB | 1920x1080 | |
| T230 | Stereo | SD | 1.3GHz | 2GB | 640x480 | |
| 9374 | Mono | Flash | 1.0Ghz | 1GB | 400x600 | |
| ⋮ | ⋮ | ⋮ | ⋮ | ⋮ | ⋮ | |

FIG. 3

| ID | ASdfn2w39c |
|---|---|
| Video | 3D |
| Video | HD |
| Video | SD |
| Audio | Stereo |
| Audio | Mono |
| Connection | Wi-Fi |
| Connection | 3G |
| ⋮ | ⋮ |

FIG. 4(a)

| ID | ASdfn2w39c |
|---|---|
| Video | 3D |
| Audio | Stereo |
| Connection | Wi-Fi |
| ⋮ | ⋮ |

FIG. 4(b)

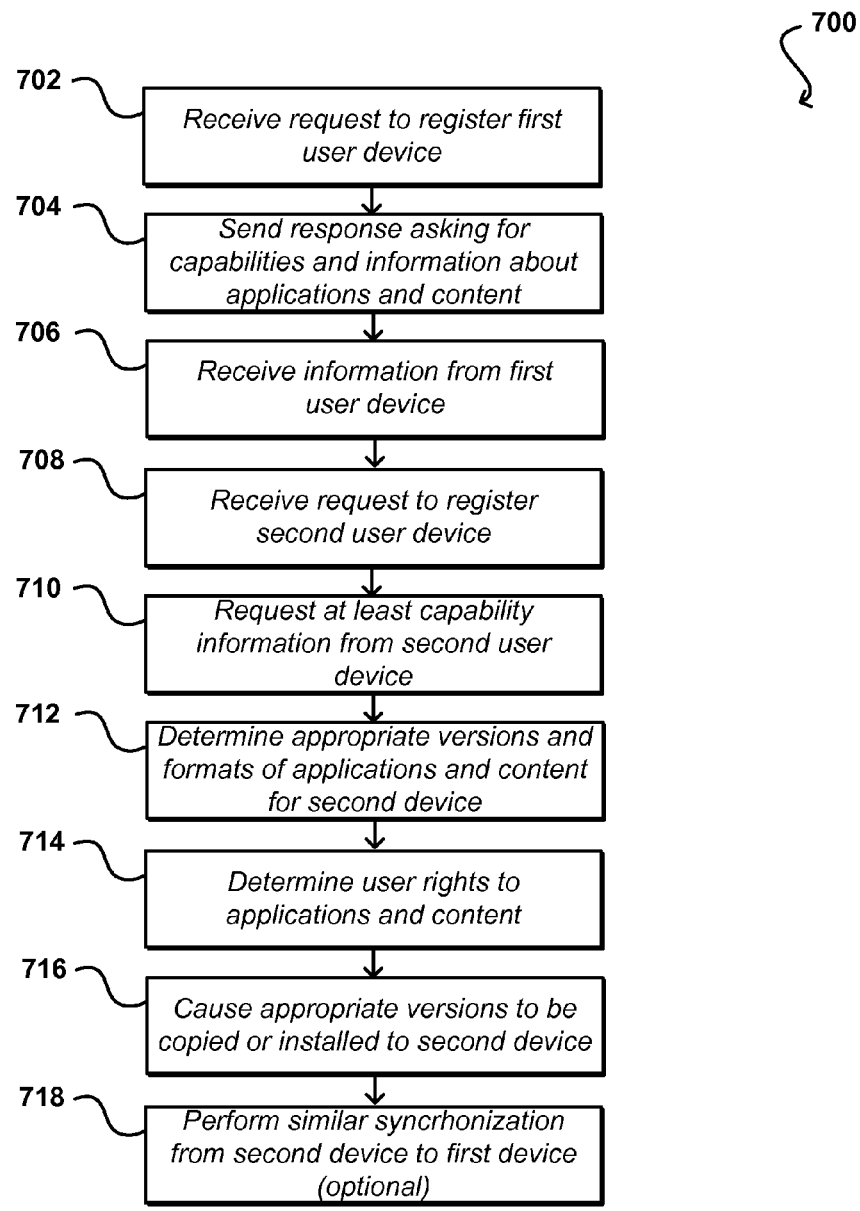

CLOUD-BASED DEVICE INTERACTION

BACKGROUND

As an ever increasing number of users rely on multiple electronic and computing devices such as smart phones, portable data assistants, electronic book readers, personal media players, and the like, there are an increasing number of applications and an increasing distribution of data that must be managed by the average user. Further complicating the issue is the fact that a typical user likely upgrades at least one of these devices every other year, if not every year. Porting all necessary information between existing devices or to a new device is not a straightforward process.

For example, data is often stored in proprietary data formats, or according to specific protocols, which can differ between devices. Further, the data is often stored in many different locations on a device, which might be associated with specific applications. A user might have to go through various export routines and synchronization processes, and still might not be able to locate and copy all the appropriate data. Further, the user might not know how to export data from an application on one type of device to an application on another type of device. If the user wishes to use the same application on a new or different device, the user typically has to repurchase that application for that specific device, and ensure that the purchased version is appropriate for the intended device. Various synchronization applications exist, but these are typically limited to certain types of devices and/or applications.

Also, there often is no easy way for these and other devices to communicate. A user might want to share information between multiple devices, but those devices might not have a common and/or established communication channel through which to share that information. Further, a user might want to be able to control aspects of one device interacting with another device, but unless those devices are previously configured and/or designed to work together, there may be no convenient way to enable those devices to communicate and/or share information as desired.

BRIEF DESCRIPTION OF THE DRAWINGS

Various embodiments in accordance with the present disclosure will be described with reference to the drawings, in which:

FIG. 2 illustrates graphical elements for similar applications executing on different types of devices with different capabilities in accordance with various embodiments;

FIG. 3 illustrates an example data table including capabilities for different types of devices that can be used in accordance with various embodiments;

FIGS. 4(a) and 4(b) illustrate examples of capability information that can be received from various devices in accordance with various embodiments;

FIG. 6 illustrates an example table including various licensing options for an application or group of content that can be used in accordance with various embodiments;

FIG. 7 illustrates an example process for synchronizing information between devices that can be used in accordance with various embodiments;

DETAILED DESCRIPTION

Figure 1:
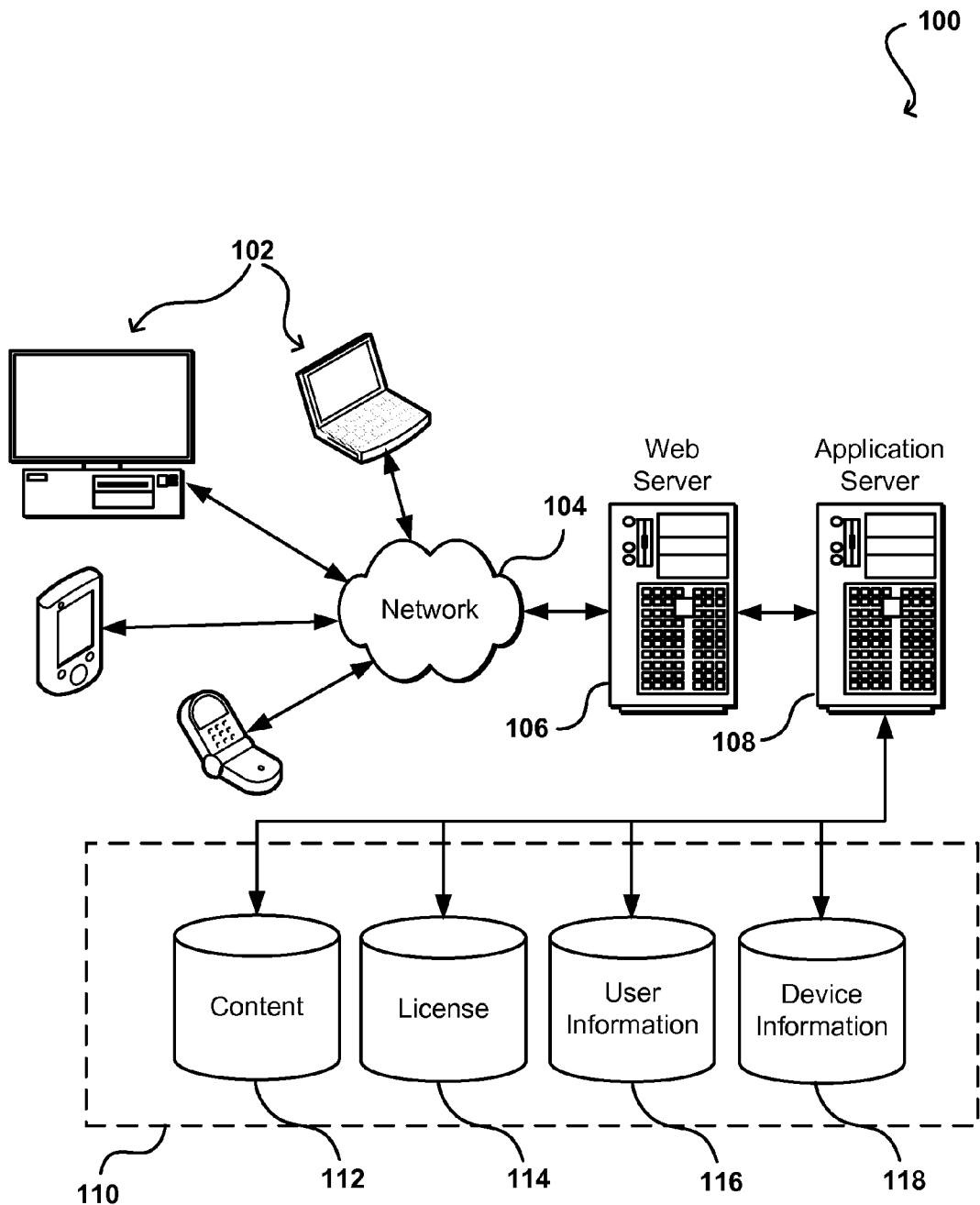
FIG. 1 illustrates an environment in which various embodiments can be implemented.

Systems and methods in accordance with various embodiments of the present disclosure overcome one or more of the above-referenced and other deficiencies in conventional approaches to managing communications between multiple devices. In particular, various embodiments enable content such as applications, media files, user data, and other information to be synchronized between devices, where each device is able to receive at least some instances of that content in a format that is dynamically determined to be appropriate for the device, based on information such as various capabilities of that particular device. Various embodiments can also enable devices to interact even when the devices are of different types that might utilize different protocols, formats, or other options or capabilities that might otherwise not enable those devices to communicate or work together for at least some purposes.

Approaches presented herein can be thought of as thinking about applications and other types of content in terms of rights to the content instead of specific files or formats. Instead of buying an application in a particular format to be installed on a particular device, for example, users purchase varying types of licenses or rights to content according to a version- or format-independent content availability business model, for example, which may include multiple existing and/or future formats, as well as other versions of a common format. Under such a license, a user purchasing a device supporting a new format does not need to repurchase an application in that new format, as the new format can already be included under the original license. Further, the upgrading of the application to the new format can be determined and performed automatically, such that the user can always access a format or version of the application that is optimal (or at least appropriate) for the device being used to execute that application. Once the user purchases such a license, the user can have rights to any evolution or variants of that content appropriate for a given device. In some embodiments, a user can automatically receive an updated version of the content (e.g., an application or file) whenever such a version becomes available, depending at least upon the rights of the user with respect to that content.

Further, instances of content might not be limited to a single format or version in the traditional sense, but can comprise a composite format. For example, an instance of "content" could actually be comprised of multiple portions or elements of related content, each of which might have a different format or version, and may require different device capabilities. For example, an instance of content might relate to an executable application as a primary element or portion of the content, but might also include other types of content as well, such as video content, game content, electronic book content, audio or text content, etc. In some instances, these portions might be part of what is referred to herein as "static" content, where the instance of content comes bundled with specific versions or formats of each portion, and those portions do not change within the instance. In other instances, the content might be what is referred to herein as "dynamic" content, wherein portions of the content might change over time, or be dynamically selected based on interaction with the content. For example, static content might include a movie with the ability to view the screenplay along with the movie. Dynamic content might allow a user to submit and view comments on a social networking site relating to the movie, or navigate to different elements via one or more decision points.

Further, for instances of content with multiple portions there can be an independent determination of which format or version to provide for each portion. For example, in one embodiment where bundles are determined together, an instance of content that includes a search application and a video rendering application might analyze the capabilities of the intended device and select the optimal combination based upon those capabilities. In some cases, the bundles might then be limited in number and/or the possible combinations. In other embodiments, the determination might be separate, such that the optimal search application can be determined and the optimal video rendering application can be determined separately, whereby the user can receive the optimal version or format of each portion of the content.

In some embodiments where the user has the appropriate rights, the content can also upgrade the capabilities of the device and versions of various portions automatically. For example, the content might include an application or other executable script. The script might be able to determine versions of one or more applications or scripts on a computing device, such as a media player, rendering algorithm, or browser plug-in, and where possible can cause upgraded versions to be downloaded and installed on the computing device such that the device can have the necessary capabilities to support a new version or format.

In some embodiments, "intelligent" content can provide one or more decision points that can determine which portions or elements of the content the user is able to access. In some embodiments, the available decision points can depend at least in part upon the capabilities and/or rights of the user and the current device. For example, a movie or application might "contain" an optional dream sequence in 3D that can be accessed by a user at a certain state. If the user does not have a 3D capable device, or does not have rights to that portion, then the decision point might not be available for the user. In some embodiments, the user might obtain a different option or element, such as the ability to view a two-dimensional version of that portion, or potentially to have access to a different portion, such as a storyboard or commentary describing the contents of the 3D portion. Such an approach can encourage purchasing of content and repeated viewing on different devices, as the experience can differ based at least in part upon the capabilities of the various devices.

As mentioned, the selection of an appropriate format for a device can depend at least in part upon the capabilities of the device. Capabilities in general include things like audio and video capabilities, as discussed in greater detail below, but can also include things like connection speed, processor or GPU capabilities, supported industry formats, types of input device (particularly for things like games), types of output device, etc. Various other factors can be used as well as should be apparent to one of ordinary skill in the art in light of the present disclosure.

For example, in some embodiments aspects such as the current rate of power consumption or amount of remaining battery life can be factored into the decisions about versions and/or formats to send to a device. For example, an application might be able to be rendered on a device with a high resolution that is relatively resource intensive. If the user is using a portable device with limited battery life, for example, the user might configure the device to maintain power usage below a specified rate, or reduce consumption when the remaining battery life hits a certain level. Thus, if the portable device meets at least one of these criteria, the device can execute or receive a format or version of the application with a lower resolution. In some embodiments, the device might monitor power consumption or other such levels, and might contact a content delivery or management service when such a criterion is met, which can cause the version or format to change automatically to the version or format that consumes resources at a lower rate. Switching between versions or formats can be done virtually seamlessly, with the user able to resume in substantially the same state in the other format. In some embodiments, when the user performs an action such as to plug in the device, the device can go back to rendering the higher resolution version or format, etc.

The determinations of various device capabilities, as well as versions and/or formats of content appropriate for those devices, can be performed by at least one logically centralized system or service. A "logically centralized" service, for example, can include at least one set of computing, storage, and/or other such resources that sit "between" two devices, such as across at least one network and accessible to both devices. A service can include any system or components provided by at least one entity that is able to send and receive requests to various types of devices, and perform any transformations, mappings, conversions, or other processes necessary for those devices to communicate via the service. A service also can be able to store information for various devices and/or determine content to be synchronized to various devices. A service can validate user identities, and determine rights to various content for those users. A service also can communicate with various content and/or application providers to provide the content of the proper format and versions for the various devices. It should be understood that terms such as "cloud service" and "content management service" are used for purposes of simplicity and ease of explanation, but these terms should be understood to be examples of the types of systems, services, components, devices, and/or entities that can perform any or all of the functions described herein with respect to the various embodiments described herein. Further, various systems, services, devices, components, providers, and other such entities can work together to provide various portions of such functionality.

FIG. 1 illustrates an example of an environment 100 in which various types of devices can request, send, and receive content, data, communications, and other information across at least one electronic network that can be used in accordance with various embodiments. Although the example environment is presented as an Internet-based environment for purposes of explanation, it should be understood that different network environments may be used, as appropriate, to implement various embodiments. The example environment includes a number of electronic client devices 102 operable to send and receive various types of information over an appropriate network 104 and convey information back to a user of the device. Examples of such client devices include personal computers, cell phones, handheld messaging devices, laptop computers, set-top boxes, personal data assistants, electronic book readers, and the like. Each device can correspond to one or more users, and each user can have one or more devices. The network 104 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 106 for receiving requests from user devices and serving content in response thereto, although for other networks an alternative device serving a similar purpose could be used, as would be apparent to one of ordinary skill in the art in light of the present disclosure.

The illustrative environment includes at least one application server 108 (or content server) and at least one data store 110. It should be understood that there can be several application servers, layers, processes, components, or other such elements, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 102 and the application server 108, can be handled by the Web server 106. It should be understood that the Web and application servers are not required and are merely example components, as structured code discussed herein can be executed on any appropriate device or host machine as discussed elsewhere herein.

The data store 110 can include several separate data tables, databases, or other data storage mechanisms and media for storing data relating to a particular aspect. For example, the data store illustrated includes mechanisms for storing content 112 (e.g., audio, video, game, and electronic book content), licensing information 114, user information 116, and device information 118, which can be used to serve content using one or more of the approaches discussed herein. It should be understood that there can be many other types of information stored in such a data store, such as page image information and access rights information, which can be stored in any of the above listed mechanisms as appropriate or in additional mechanisms in the data store 110. The data store 110 is operable, through logic associated therewith, to receive instructions from the application server 108 and obtain, update, or otherwise process data in response thereto. In one example, a user might submit a request for a certain type of content. In this case, the data store might access the user information to verify the identity of the user and access the content information to obtain information about instances of that type of content. The information and/or content can then be returned to the user, such as in a results listing on a Web page that the user is able to view via a browser or other application on the user device 102. Information for a particular instance of content can be viewed in a dedicated page or window of the browser, in a media player, as part of an application, or via any other appropriate interface.

Each server typically will include an operating system that provides executable program instructions for the general administration and operation of that server and typically will include non-transitory computer-readable media storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature and not limiting to the scope of the disclosure.

An environment such as that illustrated in FIG. 1 is often referred to as a "cloud computing" environment, as various operations can occur on behalf of the user on one or more devices that may be distributed across various appliances, locations, and/or geographical regions, referred to as being performed "in the cloud." By storing information and content in such a distributed environment, and offloading at least some computations or operations to remote systems or services, user devices can offer more functionality than would otherwise be possible, or at least practical, using a device alone. For example, a user of a user device 102 might want to download and install an application on the device. One approach to obtaining the application is to purchase rights (e.g., a license) to the application, and send a request across a network 104 to an appropriate address (e.g., a URL of a Web server 106 of a content provider). The Web server can forward the request to an appropriate system or service, such as an application server 108, which includes executable instructions for analyzing the request (and any related requests) to determine information such as the source of the request, the target information, and identity information for the user. The application server is able to validate the user identity against information in a user data store 116, for example, and determine whether the user has rights to the application using information in a license data store 114, or similar location. If the user has rights to the application, the application server can cause information for the application (e.g., an executable installation file) to be pulled from a content data store 112, application storage repository, or other such location, and sent to the destination specified by the request. It should be understood that there can be many additional or alterative systems or services for performing any of these or other such tasks as discussed and suggested herein. Further, the information returned to the destination can include any appropriate information, such as a copy of the application files or an address from which to download or otherwise obtain the files.

As discussed, a conventional license that the customer purchases (or otherwise obtains) often entitles the user to one copy of an application, or at most one copy of the application at any given time. In some cases, a user might get a multi-user license or multi-device license. For each of these cases, however, the user typically only gets access to the application in one format per the license, such as an application that runs on the user's smart phone but not on the user's tablet computer. For example, if the user buys a copy of a word processing application in a format for a specific type of computer, the user does not also obtain rights to a copy of that application in a different format for use with a smart phone or other such device. Even in cases where users are able to obtain multiple formats, such as by obtaining rights to a full version and a mobile version of an application, the user must manually select the appropriate format for each device included in the license, such as by placing an installation disc in the computer or downloading the application from a specific address. If the user buys a device with a different format or capability, the user must buy another copy of the application in order to take advantage of that format or capability. The need for multiple purchases of each application can get expensive, and can result in multiple versions that must be managed by the user. For example, there might be a specific export or conversion process for the data stored by each version or format which must be executed by the user. Further, people often do not appreciate having to repurchase applications each time a new format is developed or the user switches to a new device. Customers thus can either be reluctant to buy into new formats or versions, which can be bad for manufacturers and application developers, or can even illegally obtain the application in the new format, which is even worse.

As discussed, users typically must also manually copy over much, if not all, of the data between devices when attempting to upgrade to a new device or synchronize information across multiple devices. For example, personal contact information can be desirable to synchronize across various devices. While some applications provide synchronization programs, the user must know which program to run for each device, and must have cables or other communication mechanisms established that enable information to be transferred between those devices. In some instances, the application on one device utilizes a different storage or data format, such that the data cannot be synchronized and has to be entered, imported, or otherwise manually processed by the user. In some cases, the user has to manually search for and locate the data to copy, which can result in the user missing data stored in various locations.

In some existing approaches, data and other information can be "backed up" to a network location, whereby copies of data, application files, and other information for a user are stored to a location across a network. Such an approach enables that particular device (or a similar type of device) to be restored in the event of a crash, loss of data, or other such problem. Such an approach still comes with many of the problems associated with copying data from one device to another, however, as the same differences in protocols, applications, etc. still exist with respect to copying information from the network location to the new device.

Approaches in accordance with various embodiments descried and suggested herein enable users to change the way in which applications are purchased or otherwise consumed, as well as the way in which data for those applications is managed for various devices. Further, various embodiments provide for intelligent application delivery such that users do not need to manage various formats or versions, or make sure that the appropriate and/or optimal format is being accessed on a given device. Various embodiments enable users to obtain new or updated versions of certain applications on the same or different devices, and automatically manage and/or synchronize data for those applications, as those versions become available and/or as users obtain or access devices that are capable of executing new versions or formats. Various other capabilities and functions are provided as well as discussed with respect to the various embodiments.

As an example, consider the situation 200 of FIG. 2 wherein a user has two devices, in this case an existing smart phone 200 and a newly obtained smart phone 250. Each of these devices is capable of executing similar types of applications, displaying similar content, and storing similar data.

The capabilities of these example devices, however, are significantly different. For example, the newer device 250 in this example has a higher resolution display 252, a faster processor, more memory, and is able to support newer protocols and formats. Various other aspects of these devices can differ as well as known in the art. Accordingly, certain applications that a user executes on the existing device 200 might have newer formats that will execute on the newer device 250, which can provide enhanced functionality, better performance, etc. The format for the new device also can be optimized to take advantage of functionality offered on the new device.

In order to take advantage of these newer formats, however, the user according to conventional approaches typically must purchase and download (or otherwise obtain) these copies for the new devices. Even in cases where some of the applications are pre-installed on the new devices, however, the user still must synchronize the data between the applications on the various devices. In this example, it will be assumed that there is a "contacts" application (indicated by icon 204 on the older device and icon 254 on the newer device) and a calendar application (indicated by icon 206 on the older device and icon 256 on the newer device) pre-installed on each device. If these formats and/or versions are compatible, and the user has a cable or other mechanism for connecting the devices, the user could perform a synchronization for each of the applications, such as to copy over contacts and appointments to the newer (or even same) format/version applications on the new device 250. If the pre-installed applications are not compatible, such as where the applications come from different providers with different data formats, etc., then the user would have to figure out a way to enter the information into the new device. For applications such as an email application (indicated by icon 208 on the older device and icon 258 on the newer device) that was not pre-installed, the user would have to obtain a license and install the application on the new device, and perform a similar porting of the data. The user also would have to ensure that any configuration or preference information is entered into the new application copy as well. Certain applications, such as a clock application (indicated by icon 210 on the older device and icon 260 on the newer device), may not require data to be copied over between devices, but still may require different formats for different devices, a separate download and install process, and another configuration process to enable the application to operate with user preferences. As can be seen, there can be a number of lengthy processes needed to utilize only these four applications on another device. In typical situations where the user may have dozens of applications, as well as potentially thousands of data and media files, etc., the synchronization process can be very complicated and unpleasant for a number of users.

In some instances the user can simplify a conventional synchronization process by utilizing the same version and format on the newer device, if possible. Such an approach may not take advantage of many of the features that prompted the user to upgrade to a newer device, however. Further, relying on older versions to simplify the synchronization process does not address the fact that oftentimes newer applications and other entities or modules may not support these older versions.

Approaches in accordance with various embodiments enable a user to access applications and related data and/or content from any of a number of different types of devices, and obtain the applications and related content in a format or version that substantially matches the capabilities of each device (or at least as much as possible or practical). The user does not have to know the capabilities of each device, or the format(s) available for each device, but can automatically obtain a version and/or format that takes advantage of the capabilities of the current device. The user can submit a request from any of these devices without having to utilize a special address, input or select specific information, or perform any other such operation, and an application executing in the cloud or at another appropriate location can determine the format to be obtained by the device. Further, various approaches can also synchronize data between the devices, including data for the various applications, and can map, reformat, or otherwise manipulate or transform the data as necessary to be stored and accessible on each device, as well as to be able to be utilized by the various applications. Further, any updates to the applications, content, or data on either device can be synchronized across the various devices for the user, where the data transformations and similar operations are performed in the cloud as necessary, without any need in most cases for any manual involvement from the user.

In at least one embodiment, information for various devices is maintained in a single location. For example, a content management service could keep a list of device information, or could subscribe to another service that provides capabilities for various devices. The information can be maintained for types of devices, such as for different models from different manufacturers, or can be maintained for specific user devices. In some cases, the service can store general capability data for specific models, and store data for specific user devices when the information varies, such as when a user upgrades memory or a video card in a specific device. FIG. 3 illustrates an example table 300 that can be maintained for such purposes. In the example table, a first column 302 contains unique identifiers for each device and/or type of device for which information has been obtained. These identifiers can be any appropriate unique identifiers, such as product serial numbers or other such identifiers for device types, and similar appropriate identifiers for specific user devices. In some embodiments, unique keys will be generated which then require a mapping to specific devices or categories of devices having similar capabilities. Various other options can be used as well. The example table also includes several columns 304 listing various capabilities of each type of device. For example, the information for the first device (with ID SX3df) indicates that type of device can handle stereo sound and high definition (HD) video, includes a 3.0 GHz processor with 4 GB of RAM, and is able to display content up to a resolution of 1920×1080 pixels. It should be understood that any combination of these and/or other such capabilities or specifications of each device can be utilized as well, and that different types of information might be stored for different types of devices. The other devices listed include information for at least some of these and/or other such capabilities as well. When a request is received to obtain an application, receive data, or access content for a device, or to perform a synchronization or similar operations which could include any or all of these actions, the system or service can access this table to determine the capabilities of that type of device. Using the capability information, a format selector or other such component or module can utilize one or more selection algorithms, criteria, or other such approaches to determine one or more formats appropriate and/or optimal for that type of device, as well as appropriate mappings, transformations, etc.

In some embodiments, the format selector will select the format with the most advanced capabilities that is compatible with the device. For example, the format selector can select the application with the newest functionality, that is able to support the greatest number of protocols, that renders an interface with the highest resolution, etc. In some cases, the selector can always select the most recent version of an application that is capable of being supported by the device. In other cases, the selector can utilize an algorithm that can rank the formats, or obtain rankings from a provider of the application in the various formats, for example, and can select the highest ranking format (or another format per at least one selection criterion) to provider to the device. In some cases, there might be various formats available that have different levels of capability combinations. Various ranking factors can be utilized to determine the overall ranking score of each format in such an instance. In some cases, users can set rankings, specify formats to be preferred or not considered, etc. In some cases, the user might specify to never upgrade or change formats from an existing version or format, where possible, unless requested or approved by the user. In some embodiments, an application provider or content manager can examine other information such as user history or behavior information to attempt to determine a format that is not only appropriate for the device, but also optimal for that particular user.

In at least some embodiments, however, it can be undesirable or at least impractical to attempt to maintain a list of all potential devices and capabilities, which must be updated each time a new device is available, an upgraded capability is available, etc. Further, certain software or software upgrades might be made to specific devices such that devices of the same type might have different capabilities. Accordingly, approaches in accordance with various embodiments instead obtain the capability information from the device itself For example, a content management service might receive a request to install a specified application to a specific device. If not already included in the initial request, the content management service might send a response back to the device to ask for the capabilities of the device. In some embodiments, this response is sent only if there are multiple formats of the requested application available, or if the application is of a type of format that might not be able to be accessed properly (or at all) on certain devices. The response can be for a list of all relevant capabilities, as may conform to a specific standard, or for values of specific capabilities. The device then can send the information to the content management service (or directly to an application provider) in a form similar to that illustrated in the example table 400 of FIG. 4(a). In this example, the device sends a list of all potential formats and/or capabilities that are supported by the device, such as are described above with respect to FIG. 3. Using this information, an application selector can determine all potential combinations of capabilities for the device and use these combinations to select the appropriate and/or optimal application version or format to be installed on that device. The capabilities in some embodiments are ranked by the relative desire of each capability. It should be understood that a table is just an example, and that the information can be conveyed in any appropriate manner.

FIG. 4(b) illustrates another example of a capability table 450 that can be sent by a device in accordance with various embodiments. In this example, the device does not include each of the capabilities of the device, but lists specific capabilities, as may be requested by the application provider or content management service. In some embodiments, these can be specific capabilities which the user requests or requires. In other embodiments, these values can be preferences or can specify the maximum value for each capability. For example, if a device can support any common video resolution up to HD video, the device might return a single value of HD, and the content provider can select any format including or up to HD-quality video.

Figure 5:
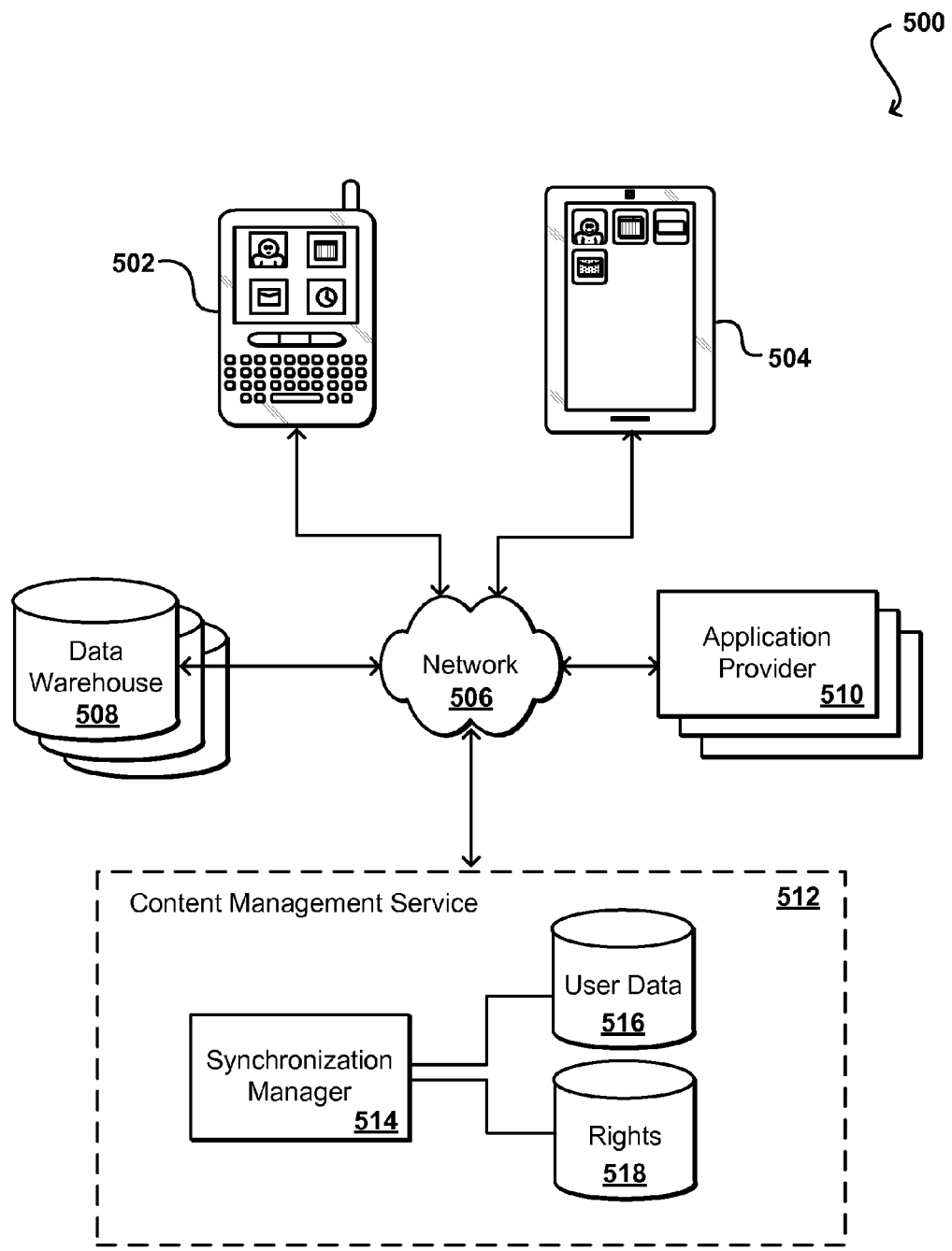
FIG. 5 illustrates an example environment for synchronizing information between devices that can be used in accordance with various embodiments.

FIG. 5 illustrates an example system configuration 500 that can take advantage of such capability information to dynamically and intelligently determine appropriate versions and/or formats of applications, data, and other such content to be received to a user device, as may be part of an installation or synchronization process in accordance with the various embodiments. In this example, a user owning a current device 502 is attempting to synchronize and/or port information from that device to a new device 504, having different capabilities as discussed above with respect to FIG. 2. It should be understood, however, that similar approaches could be used when a user attempts to purchase an application or content for either device, or when changes are made to one device that need to also be made to the other device. Further, it should be apparent to one of ordinary skill in the art that this figure includes basic components for purposes of explanation and ease of understanding, but that there can be many additional and/or alternative components utilized for such purposes within the scope of the various embodiments.

Although a synchronization process can be initiated in any of a number of different ways, in this example the user logs into a Web site operated by a content management service 512 from the new device 504. Assuming the user has an account or otherwise has information stored with the content management service, the user can send a request to the content management service, through the Web site, to synchronize the new device 504 with at least one other device for which the content management service has information. In some embodiments, this can include synchronizing information from any or all of the devices for which the content management service has information. In other embodiments, the user might select a specific device (e.g., the current device 502) to synchronize with the new device 504.

When the content management service 512 receives the synchronization request, the service (having already validated or authenticated an identity of the user during the login process) can examine information for that data in a user data store 516 to determine existing information for that user, such as existing devices, types of applications or content to be synchronized, etc. The content management service 512 also can send across the network 506 a request to the new device 504 for capability information, as discussed above, or at least identifying information that can be used to determine capability information for that device.

In addition to determining the capability information of the new device 504, the content management service must also determine information from the current device 502 to be synchronized. In some embodiments, a copy of the information may be stored by the content management service, such as in a user data store 516 or other appropriate location. In other embodiments, the content management service may send a separate request to the current device 502 for synchronization information, such as list of applications, data, and other content to be synchronized onto the new device. In still other embodiments, the content management service (or an application associated with the content management service) can scan the current device 502 for synchronization information, then send that information over the network 506 to the content management service 512. Various other options for obtaining this information can be used as well within the scope of the various embodiments.

Capability information obtained for the new device 504 and synchronization information indicating applications, data, and other content from the current device 502 to be synchronized to the new device can be forwarded to a synchronization manager 514 or similar system or service. As part of the synchronization process, the synchronization manager can determine a list of applications to be installed on the new device 504. In some embodiments the synchronization manager will attempt to copy over, download, and/or install all applications, while in other embodiments the user might specify certain applications to include (or not include), or capabilities might prevent certain applications from being installed on the new device. In at least some embodiments, the synchronization manager can analyze a rights data store 518 and/or contact at least one rights maintenance service to attempt to determine whether the user has existing rights to install each application on the new device, as well as to which formats or versions those rights apply. In cases where the user does not have rights to install another instance of the application, or does not have rights to install the optimal version for the new device, the user can be prompted to purchase a new license, expand an existing license, choose not to install that application on the new device, or any of a number of other such options.

Except in cases where the content management service provides files for one or more applications to be installed on the new device, the synchronization manager can determine an appropriate version of each application or send information to the application provider to make such a determination, then provide the user or the application provider with information necessary to cause the application to be installed on the new device 504. In some embodiments, the content management service (in response to a request or at any other appropriate time) can contact at least one application provider 510 for information about various capabilities or specifications needed to run certain applications, as well as different versions or formats of those applications. Thus, when capability information for a device is determined, the synchronization manager can determine the appropriate version or format, and can indicate to the user and/or application provider which version and/or format is appropriate. In other embodiments, the synchronization manager can send capability and similar information for the user and device to the application provider, who will then determine the appropriate format and/or version. After the determination is made, the content management service and/or application provider in certain embodiments can send a link or address to the new device 504 enabling the device and/or a user of the device to download (or otherwise obtain) the appropriate version and/or format. In other embodiments, the content management service can send instructions to the application provider that the application should be pushed to the new device. Various other options can exist as well, which can be configurable and/or require authorization by the user. If the user has several applications to be installed on the new device, the synchronization manager might need to contact multiple application providers as appropriate.

In addition to causing applications to be installed on the new device 504, the content management service might also have to cause information for those applications to be copied to the new device. As discussed, in some embodiments the data and user information for the old device can be stored on the network, such as to one or more data warehouses 508 or other appropriate locations. In other cases, the data and information might be stored by the content management service, the current device, or any other appropriate entity. The synchronization manager 512 can determine the data that needs to be copied to the new device 504, as well as the format and/or application corresponding to that data on the current device 502. In some cases, an application on the new device will use the same data format, etc., such that data can be copied directly to the new device. In other cases, the format or another aspect of the data for the new application is different, or the user has installed a different application with different data requirements, such that a mapping or transformation must occur. In some embodiments the content management service stores at least some of the necessary information, while in other embodiments the synchronization manager can contact at least one application provider or third party mapping or data transformation service in order to make any changes necessary for the data to work with the application(s) on the new device. In some embodiments, the data stored to the data warehouse 508 is first mapped to a general data format specified by the content management service 512, such that when the data is to be copied to a new device a known mapping from the general data format to the format for the new device can be used. Various other mappings and data transformations can be used as well.

The synchronization manager also can look to various types of files to be copied over to the new device 504. In some cases, any documents, pictures, and other such files created by a user can be copied over to the new device without alteration or transformation. In other embodiments, as may be configurable by the user, the synchronization manager might cause documents to be saved in a format appropriate for a word processing application on the new device, images might be processed to improve quality or resolution using tools on the new device, or any other appropriate change can be made as appropriate. Further, using the capability information of the new device, as well as rights and other such information, the synchronization manager can cause appropriate versions and/or formats of content stored on the current device to be stored to the new device. For example, if the user has a format of a movie stored on the current device, but an improved version is available that will work with the new device, the synchronization manager or content management service can cause the optimal or improved version to be stored to the new device during the synchronization process. Thus, not only is the content copied over to the new device, but the version or format of that content can be selected automatically based at least in part upon the capabilities of the new device. Various approaches for optimizing or dynamically selecting content formats to be provided to a specific device are described in co-pending U.S. Patent Application No. 12/890,109, entitled "RIGHTS AND CAPABILITY-INCLUSIVE CONTENT SELECTION AND DELIVERY," filed Sep. 24, 2010, which is hereby incorporated herein by reference.

The synchronization manager 514 can monitor the synchronization process, and can contact the user regarding any conflicts, inconsistencies, questions, or other such issues with the synchronization process. If there are any applications, instances of content or data, or other information that should be synchronized with the current device, a similar process (or portion of the same process) can cause that information to be copied to the current device as well, such as to update new contacts on the current device, etc. In at least some embodiments, the user can control whether information on the new device is also synchronized with, and copied onto, the current (previous) device. Further, if the user has multiple devices registered with the content management service, the synchronization process can be extended to include these devices as well. In some embodiments, the user can configure which information to synchronize between certain devices. For example, a user might want business information synchronized between business devices, and personal information only synchronized between personal devices, while information such as the user's calendar (and calendaring application) might be synchronized between all devices.

As part of the synchronization process, an application also can be stored on the new device that monitors for any changes on the device, and communicates with the synchronization manager to enable the synchronization manager to determine whether those changes should be propagated to any of the other devices for that user (or group of users). In other embodiments, one or more applications on the new device can be configured to communicate change information to the synchronization manager. In still other embodiments, the content management service and/or synchronization manager can periodically scan the devices for differences that should be synchronized to other devices. In at least some embodiments, the user can also manually initiate a scan for synchronization, scans can be setup at specific times or intervals, etc. As part of the scans, or based upon information stored by the content management service, information for the various applications can be analyzed and new application versions can be automatically installed to the various devices as appropriate, based upon factors such as capabilities, rights, and user configuration and preference options, as discussed herein. Using such an approach, a device not only receives the optimal version of an application or instance of content at synchronization or installation, but can also automatically receive updated versions or formats as those versions or formats become available.

As discussed, the mere fact that there are multiple formats of an application available, one or more of which might be optimal for a particular device, does not necessarily determine which format or version the device or user receives. For example, the license obtained by the user for that application or piece of content might not include access to certain formats. A user might have only purchased or otherwise obtained a license for a single format (e.g., downloaded a specific version without rights to other versions), such that the other formats are not accessible on other devices even if the format for the purchased license cannot be accessed on that device. Even if the license entitles the user to other versions or formats at the time of obtaining the license, the license might not apply to future versions or specific formats, etc.

Embodiments discussed herein can consider the rights to specific content for a user, as opposed to specific instances of that content as in previous approaches. For example, instead of registering that a user has purchased a specific version of a video game in a particular format, a license determination module or other such component or service can instead register, update, and otherwise maintain the rights that the user has to versions, formats, and/or instances of that game. For example, the table 600 of FIG. 6 illustrates variations of rights to an application or piece of content that can be obtained by a user. In this example, the user can purchase a license that enable that user to access or install a game on a specific number of devices. For example, the user might purchase a single-device license whereby the user is only able to install that content on a specified device. Depending upon the terms of the license, the user might be able to migrate that license to a different device, specifying at most one device at a time, or the license might be tied to a specific physical device. A user might also be able to purchase a multi-device license, whereby in this example the user can install the game on up to four devices at a time. The cost can be greater for a multi-device license than a single device license. A user in some embodiments might also be able to purchase a license whereby the user can install the game files on any device, with the license still applying to personal use by that user (or up to a specified number of users). In an unlimited personal device license, the user might have to be identified to the application provider in such a way that the application provider can monitor whether the user is enabling other users to improperly utilize the unlimited personal license, in order to prevent content theft. The cost for unlimited personal use also can increase accordingly.

While there are various types of multi-user or multi-device licenses known in the art, approaches in accordance with various embodiments also enable users to purchase varying levels of format and/or version licenses, which can include versions or formats that are not yet developed or available, and that can be provided to a user automatically when available without the user necessarily knowing the type of format or version. And, as discussed elsewhere herein, these formats and/or versions can be selected dynamically and/or intelligently by a system or service based at least in part upon the capabilities of the device which the user is using to access the content.

For example, in FIG. 6 there is a licensing option that enables a user to purchase a single version and/or format license, which enables the user to install only the original format and/or version that the user obtained via purchase, download, etc. Depending upon the type of device license, the user might be able to install this format and version on multiple devices, but those devices still will only be able to install that particular version and/or format, independent of the capabilities of those devices. For example, if the user purchases a version of a game in standard definition and decides to play that game on a device capable of rendering high definition content, the device still will only be able to play the standard definition version allowed under the license.

The user also can be able to obtain, in at least some embodiments, a license to all current versions and/or formats. For example, a user purchasing an online video game might be able to purchase a license to play that game in any existing format, such that the user can access that game from a personal computer, Xbox 360®, Playstation 3®, or Wii®, which might include all the formats in which that game can be accessed at the current time. The cost for such a license might not be any greater than for a single format license, as the essential content might not be different, but the interface through which the user accesses the content might be in sufficiently different formats. In another example, the user might be able to obtain a license to DVD, Blu-ray®, and digital copy versions of a movie. The cost for obtaining the license to all three can be greater than the cost to obtain a license to just one of these formats, but less than the cost of obtaining licenses to two or three of the formats individually. Such an approach can be attractive to a user because the user can obtain additional formats of the movie for a relatively small additional cost, and can be attractive to the provider of the movie as such a pricing structure encourages the users to purchase a more expensive license with the original purchase.

Also as seen in FIG. 6, a user in at least some embodiments can obtain a license to any version or format, including any future version or format of the game. For example, the user might today be able to play a game with any appropriate output by format, such as formats or versions capable of rendering 3D, HD, and/or SD output. By purchasing or otherwise obtaining a license to any format, the user also can download, install, or upgrade to that content in those formats as those formats become available. For example, technology might develop that enables the game to be displayed as a fully three-dimensional hologram. If the user at some point in time purchases such a holographic game console, the user will not have to repurchase that game in the new format. Such a license can be attractive to a user as a user can purchase an application or piece of content once and not have to worry about repurchasing again at a later time in a new format, etc.

Such a license also can be attractive to a content provider because, although the provider will lose revenue from users repurchasing their applications and/or catalog of content in new formats, the provider will obtain money for formats that do not yet exist, which can improve short term revenue while providing funds to develop those future formats up front (instead of trying to recoup those development funds afterwards, which can be risky due to events such as competing format wars where one of the formats often fails and results in losses to supporters or adopters of that format).

Also as can be seen in FIG. 6, the user can have the option of purchasing the unlimited format and/or version license for one, multiple, or any number of devices. Although the prices can go up accordingly, an unlimited personal use license in any format can ensure that a user only has to purchase a license for an application once, as the user can install that application in any format on any supported device without having to repurchase the application, purchase a new license, etc. It should be understood, however, that users might purchase less than full use licenses in order to reduce costs, particularly if the user is not sure how much the user will enjoy or use the application, but that the user might want additional formats, versions, or device installs at one or more subsequent times. Approaches in accordance with various embodiments can enable users to upgrade their licenses for less than the cost of a new license. For example, in FIG. 5 a user can purchase a single format and version of an application for installation on a single device. If the user frequently uses the application, the user might want to upgrade to own any version of that application, and be able to install that application on any device. The single device and format license is $9.99 in that example, with the limited license being $39.99. In some embodiments, the user might be only charged the extra $30.00 to upgrade the license, while in other embodiments the user might be charged some intermediate additional price, such as $32.99, which is less than the cost of the unlimited license, but includes an extra fee to cover the cost of the additional transaction. Various other approaches and pricing structures can be used as well within the scope of the various embodiments as should be apparent in light of the present disclosure. In some cases a user might be able to receive discounts for licenses, such as by enabling content providers to share information (not including user identifying information) about viewing preferences, how often users access certain content, how often users finish certain content or how far the average user gets, etc.

Once a user obtains or upgrades a license to an application or piece of content, information for that license can be stored to an appropriate (logically) centralized location, such as the license data store 114 illustrated in FIG. 1 to be accessible over a network. In some embodiments, a content management service or other such entity can subscribe to a licensing or rights service, which can manage the information for various content providers, users, and other entities. An advantage of a rights service is that different formats and/or versions might be provided by competing content providers, who might not want to share information with each other but may need to know the type of license the user has already purchased for the piece of content. In some embodiments, the licensing service can handle the royalties associated with the content, and might manage (or at least provide information needed to manage) the funds associated with the various licenses, such that various content providers can receive compensation when the user accesses their format or version using a license that was purchased through another provider. Various other revenue sharing approaches can be used as well.

FIG. 7 illustrates an example process 700 for using capability and license information as discussed above to dynamically synchronize applications, files, and other such data and/or content among two or more devices, wherein the synchronization takes into account appropriate format(s) to provide to each device as part of the synchronization process. In this example, a request is received to register a first user device with a content management service 702, such as where a user selects an icon or link on a device which causes a request to be sent over a network to a service or other such entity. Unless such information is included in the initial request or otherwise available to the content management service, the service can send a response to the first user device asking for the capabilities of that device, as well as information about the installed applications, stored content and data, and other such information 704. This can include a request for all device capabilities, a specific capability, or anything inbetween, as well as a request for all applications and files or a subset thereof. A message or other communication including at least some of the requested information then can be received from the first user device 706. The content management service then can store at least some of this information with respect to the first user device. In other embodiments, the service might request this information during any synchronization process instead of storing the information, or can request this information again at a time of synchronization to determine any delta or change information to be propagated to another device.

At a specific point in time, a request is received to register a second user device with the service 708. For example, the request can include an explicit synchronization command, a separate synchronization request can be received, or the user can configure the service to synchronize among devices in various embodiments, among other such options. In response, the service can request at least capability information for the second user device 710. Assuming the user has in some way authorized synchronization between the devices, the content management service can determine the appropriate versions and/or formats of applications, files of content, and other elements or data objects from the first user device to be installed or copied over to the second device as part of the synchronization 712. The content management service can also determine the rights that the user has to additional versions, formats, and/or copies of those elements or objects 714. While in this example the license verification is performed after obtaining device capabilities, it should be understood that these (and additional, fewer, or alternative) steps can be performed in other orders, concurrently, or in parallel within the scope of the various embodiments unless otherwise stated. If the user has a variable or flexible type of license that is not specific to a single format, version, or other such aspect, the content provider can determine the appropriate format and/or version based at least in part upon the device capabilities and rights information. As discussed elsewhere herein, this can include determining compatible versions or formats, and ranking or otherwise selecting at least one version or format based on specific ranking or selection criteria, as well as using any other appropriate information such as user preference or behavior information. In some embodiments, the content provider also can provider the user with an option of a version or format to receive out of all compatible formats and versions, etc. Where the user has rights to those elements, the content management service can cause appropriate versions to be copied and/or installed to the second user device 716. In some embodiments, the content management service will provide the applications, files, or other content, while in other embodiments the service will cause the information to be received to the second user device from one or more content providers. In at least some embodiments, a similar process will occur to determine and cause appropriate versions of elements and objects on the second user device to be copied and/or installed to the first user device 718, in order to provide for a full two-way synchronization. In some embodiments, where a user is upgrading to a new device, the copying and/or updating may be primarily, if not completely, in one direction. In other embodiments, such as where there may be three or more devices to be synchronized, the user might indicate types of content to be synchronized between specific devices. Many other options exist as well within the scope of the various embodiments.

In some instances, a device might not respond with information about its capabilities. A device might not respond for any of a number of reasons, such as the device being an older device without such communication capabilities, or working with a different format or protocol, etc. Various approaches can be utilized in accordance with various embodiments to attempt to determine which format to enable the user to install on the device. In some embodiments, a format with the least or lowest capability requirements can be provided, as the device will be most likely to be able to support that format. In some embodiments, the user can also be presented with an option to select a different format. If the system has determined the various formats to which the user has rights for the content, the user can be presented with a list of at least some of those formats, and allowed to choose which format to access.

By analyzing capabilities and determining appropriate formats, applications in some embodiments can also be pushed to other devices that the user might not even be aware to be capable of supporting those applications. For example, a user might purchase an application that tracks the user's activities over time, with the intention that the application will be installed on the user's smart phone and home computer. In some embodiments, a user can configure a content management service to synchronize applications, data, and files across as many user devices as possible. In such an embodiment, the service might also cause the application to be installed on other devices as well, such as on the user's television set (where that set includes processing capability and network access), video game console, and portable media player. As the user obtains additional or alternative devices, the service can analyze these devices as they are registered with the service and attempt to synchronize the applications and data to those new devices to the extent possible, or at least the extent permitted by the user. The service could also monitor new versions or formats of specific applications, and push those application updates to the appropriate registered devices based at least in part upon the capabilities of those devices and the rights of the user with respect to those updates.

In some embodiments, user data (e.g., documents and pictures) and other files (e.g., music and video files) can be synchronized across all registered devices, to the extent possible and/or allowed. In other embodiments, a cloud service might cause at least some of the data to be stored at a remote location, such as a data warehouse of FIG. 5, whereby certain devices might instead obtain information enabling that device to access that data. For example, a home computer with sufficient storage capacity might get a copy of each media file for a user, while a portable media device with limited memory might get only certain files, such as frequently accessed files, while the other files are stored in the data warehouse (or on another user device or appropriate location) and accessible to the media player. Similarly, applications might be too large or require more processing power than is available on a certain device. For example, a video game might be able to be played on a video game console with an advanced graphics processor, but might not be able to be played on a smart phone. In some embodiments, the application can be executed on a server out in the cloud, and the video output can be streamed to the smart phone, such that applications can be accessible to devices that otherwise do not have the capabilities needed to run those applications.

The service also can maintain application state across the various registered devices. For example, if an application is playing a piece of content (e.g., a music file) on one device the user might decide to pause the playing on that device, and access that content from another device (such as when the user arrives home and wants to listen to a home stereo instead of a car stereo). In this case, the state of the application (e.g., the point in the music file) could be maintained, and the content resumed at the same location on another device, even when that other device utilizes a different format of the file. Similarly, a user playing a game on one device might have state maintained by the service, such that if the user resumes playing the game on a different registered device the user can still resume from the same location even if the formats of the games are different and do not otherwise allow for maintaining game state across devices and/or formats.

Referring back to the example with the video game accessible on the smart phone, the smart phone might have very different input mechanisms than the video game console. For example, the smart device might have a touch screen instead of a hand-held, multi-axis controller. In some cases, the cloud service might determine, as part of the device capabilities, the available input mechanisms, and select a version of the application that is appropriate for those types of input. In other embodiments, the service might modify an application on the device, for example, that can map the available inputs of the device to the inputs necessary for the application or game. For example, the cloud service might execute an emulator in the cloud or on the device that enables the capabilities of the device to be used for certain aspects of the application. In other embodiments, the cloud service can provide a mapping as part of a library or other set of files capable of being used by the application to accept input from, and generate output to, the device.

The ability for a content management service or other such entity to obtain and/or maintain capability information for various user devices also enables other functionality to be implemented with respect to the various devices. For example, consider the example configuration 800 of FIG. 8. In this example, a smart phone 802 and a television 804, both able to communicate with a content management service over a network, can have their capability information, installed applications, and/or other such information determined by, and available to, the content management service. As discussed, the content management service (or a similar entity or system) can determine not only the versions or formats of specific applications on each device, as well as the capabilities of each device, but can also perform mappings and transformations necessary for data to be stored and/or processed by each device. Using such functionality, the centralized service can serve as an intermediary or "proxy" device that enables the two devices to communicate with each other, share data, and perform other such operations, even though those devices were not previously associated with each other, may have no knowledge about each other, and might not otherwise be able to communicate due to different formats, protocols, etc. The ability to enable any two such devices to communicate without having to have any knowledge about, or direct communication with, the other device enables the devices to interact in any of a number of different ways without any configuration, setup, identification, or other such process, enabling any appropriate devices able to communicate with the content management to be effectively "plug and play" with respect to various other devices for a variety of purposes.

Figure 8:
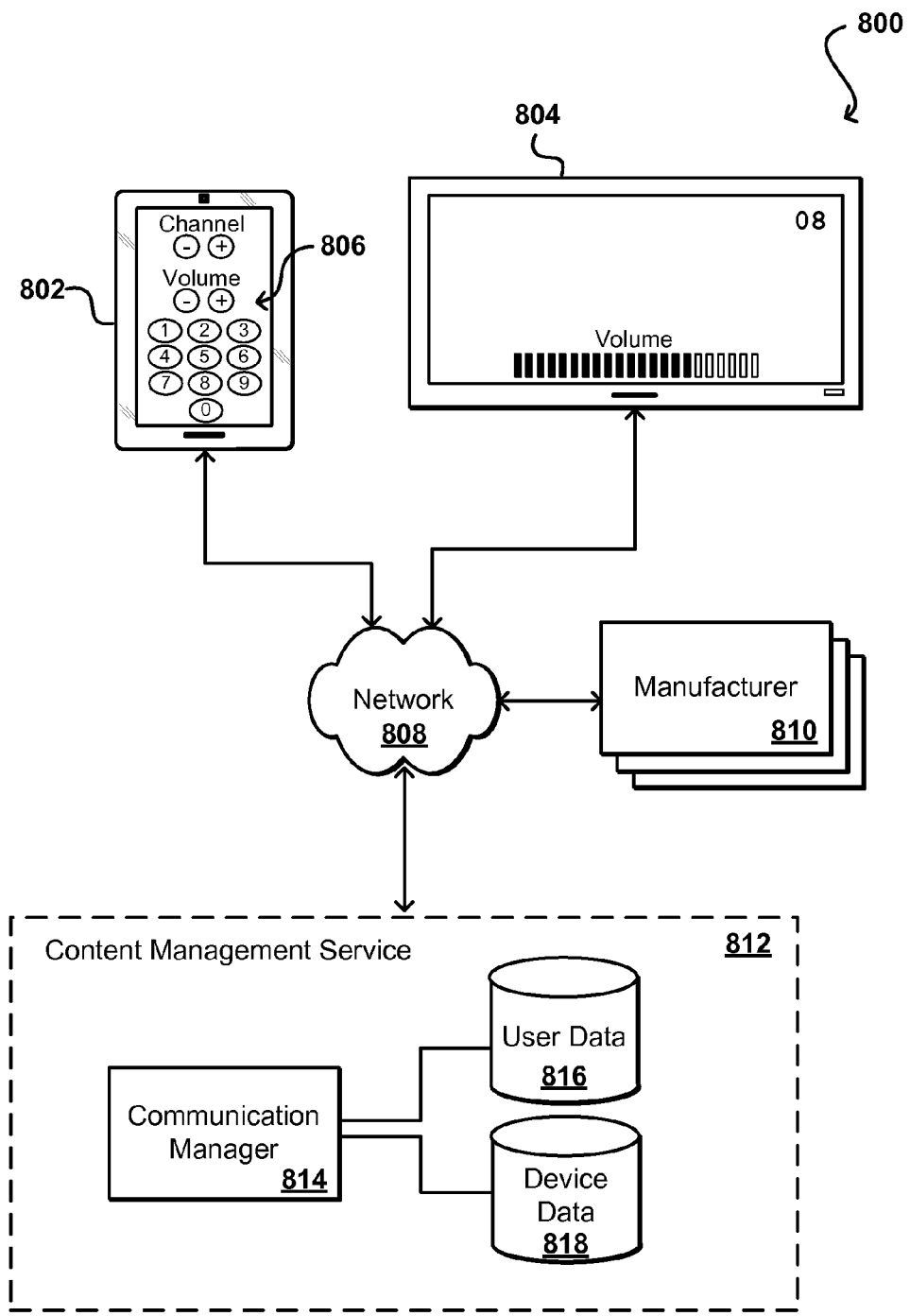
FIG. 8 illustrates an example configuration enabling disparate devices to communicate with each other in accordance with one embodiment.

For example, in FIG. 8 the user device 802 may be registered with the content management service 812 as discussed elsewhere herein, such that the content management service stores, or at least can determine, aspects of the user device such as the installed applications and various capabilities. As should be apparent, the content management service also can have a number of other devices registered, that may or may not be associated with the user. In this example, the content management service is also in communication with a television 804 that is, or at least works with a device that is, network-capable and able to communicate with the content management service 812. A user of the user device might like to be able to control aspects of the television 804, such as the volume level or current channel, using the user device 802. Such an approach is not possible using conventional methods, unless the user device has an infrared (IR) emitter or similar element capable of emitting IR signals coded in a way to be received and interpreted by the television, as well as an application on the device enabling the user to specify commands to be transmitted to the television. The device would also have to be programmed to provide appropriately-coded IR signals, and the television of a type that is able to receive and interpret such signals.

In this example, however, the user device 802 and television 804 are both able to communicate over the Internet (or another appropriate network 808) with the content management service 812, or another such system or service. As discussed, the content management service is able to determine the formats and capabilities of each device, and perform necessary data conversions or transformations for either device. Instead of (or in addition to) synchronizing information between devices, then, a content management service can be configured to enable communications between those devices, which can include instructions, commands, requests, and other such communications. Thus, if the content management service is able to determine input commands for a first device, and communicate information about those available input commands to a second device operable to issue at least some of those types of commands, the service can enable the second device to control (or at least communicate with) the first device, even though the devices otherwise have no information about each other or any direct means of communication. In some cases a television might be Web-enabled, or have similar capabilities enabling commands to be provided over the Internet or a similar network. Even in such cases, however, there is no guarantee that the user device and television will be able to communicate or at least understand various commands using conventional approaches. Further, in some cases a user will not want a device to receive commands directly from an unknown user or device.

In one example, the content management service could request information from the television 804 indicating acceptable and/or available input commands, such as channel or volume controls, and can request an appropriate protocol or format in which those commands must be provided to the television. In some cases, the content management service might store this information, and only need an identifier, model number, or other such information from the television. In still other cases, the television or a similar device might provide a model number and manufacturer information, or similar data, which a communication manager 814 or similar component of the content management service can use to obtain that control and format information. In this example, the content management service can be in communication with systems for one or more manufacturers 810, or at least services that store information for those manufacturers. The content management service can, upon receiving identification information from the television, send a request to the appropriate manufacturer or other such entity to obtain command, format, and other such information.

The content management service 812 also can obtain similar information for the user device 802. For example, the content management service might determine at least one format for the user device, as well as available input and/or output commands. As discussed above, the communication manager 814 or another such component can provide mapping or transformation functionality such that the type of input commands acceptable to the television 804 can be conveyed to the user device 802 in a format that the device can understand, and when a command for the television is received to the communication manager 814 from the user device, the communication manager can generate the appropriate command in the appropriate format to send along to the television. Thus, the user device can send a command in a format appropriate for the user device, which is received by the communication manager, whereby the communication manager can generate a corresponding command in a format appropriate for the television and send along the command to the television 804.

In some embodiments, the user device can access the television or other such device by accessing an address (e.g., a hyperlink or URL) provided for the television. For example, if the television is in a bar or restaurant which enables customers to change the channel, the establishment might provide a URL on the side of the television or in another appropriate location which the user can access to be able to control the television using the accessing device. In some embodiments, the URL is a link to the content management service 812, and also contains an identifier for the particular device being accessed as a parameter of the URL. The user then can be presented with a Web page or similar interface indicating the available commands for that device. As illustrated in the example of FIG. 8, the user device renders on a display element 806 a page including user-selectable elements for scrolling through the channels, adjusting the volume, or typing in a specific channel. The content of the page can be determined and/or provided by the content management service, the manufacturer of the television, or the television itself, among other possible sources. In other embodiments, the user device 802 might execute an application that provides such an interface based upon information received from the content management service 812. Various other such sources can be possible as well. In this example, the user is able to select one of the options on the user device, which causes a corresponding message or request to be sent to the content management service for translation in at least some embodiments. In other embodiments where each displayed element has an address and command understandable by the television, and the television has a unique address, port, or other such location, the requests from the user device can be sent directly to the television without having to first pass through the content management service (once the service generates and/or provides a Web page to the user device that is dynamically determined to be appropriate for the user device with commands appropriate for the television).

Another advantage to utilizing a link or other such mechanism to access another device via the content management service is that the user device does not previously have to be associated with the content management service for the particular other device. In the situation of FIG. 8, for example, the television in the establishment might be registered with a particular service 812. If a user walks into that establishment for the first time, the user device likely has not communicated with that television before, and may not have communicated with that service before. When the user device accesses a link for that television, the request from the user device can be received by that content management service 812, which then can request specific information from the device in order to enable that device to communicate with the television. In some embodiments, the service might not even require information about the user device, but might instead provide a Web page or similar page to be rendered on the user device, using a conventional approach compatible with most devices, which includes links or other mechanisms that cause requests to be generated in a format capable of controlling the television, whether those requests first go to the content management service 812 or go directly to the television 804.

In at least some embodiments, the communication can be two-way, such that the television can send information back to the user device. For example, if the television has an output for streaming the content being displayed on the television, the television can also send that information to the user device once communication is established via the service. The television can send other data as well, such as closed caption data or alternative language audio. If the television is playing a trivia game, the television (or a device in commutation with the television) can send question and/or answer information to the device, and in at least some embodiments can enable the user device to act as a game controller for a game being displayed by the television. Many other such interactions are possible as well, as the content management service effectively enables any appropriate devices to communicate with each other for any appropriate purpose, enabling any devices able to communicate with the service to effectively become "plug and play" with each other for at least certain types of interactions.

In some embodiments, devices might be able to detect other devices in a proximity of the device, such as by using Bluetooth communications, imaging technology, etc. If a device is able to obtain an identifier for a nearby device using such an approach, the device can attempt to communicate with that nearby device by contacting a content management service or other such entity to attempt to determine whether the service can communicate with that device. If both devices are appropriate devices, each device can contact such a system or service, and once both are acknowledged by the service the devices can be able to communicate via that service (to the extent possible). In some cases, the various devices might install or execute applications that enable those devices to communicate with a central service or other such entity that enables communications. Any of a number of other approaches for associating a device with a content management service or other such entity can be used as well within the scope of the various embodiments.

In still other embodiments, a device such as the television 804 in FIG. 8 can utilize a content management service 812 or communication manager 814 to attempt to interpret commands or requests received from another device. For example, if the television and user device 802 are both able to communicate using a communication channel such as Bluetooth, it is possible for the television to receive a request over that communication channel. In some cases, however, the television will not be able to understand the request. In at least some embodiments, the television can forward information for the request (e.g., as an attachment or inside a wrapper) to a content management service or similar entity, which can attempt to interpret the message. In some embodiments, the content management service can contain mappings and attempt to use those mappings or transformations to interpret the commands. In other embodiments, the service can attempt to contact the user device (using the origination information from the original request) to request format, capability, and/or other such information from the user device for use in interpreting the commands. It should be understood that the opposite is possible as well, wherein the user device contacts a content management service or similar entity to transform a command before that command is sent by the user device to the television, etc.

In some embodiments, devices can expose a specified set of commands. For example, the television 804 might expose commands that enable another device to change the channel, but might not enable the device to record a show for a television with built-in recording capability. In other examples, a user might be able to configure or allow certain commands or ranges of commands. For example, a user configuring the television might enable a user to only change the station to certain channels, such as channels only displaying certain types of content. In another example, a user might set the allowable range of volume that can be adjusted on the television, such that another user device cannot turn the volume up too loud or mute the television. A user can configure any set or ranges of commands as appropriate, such as enabling certain channels to be accessed at certain times, enabling different types of users to submit different commands, etc.

Figure 9:
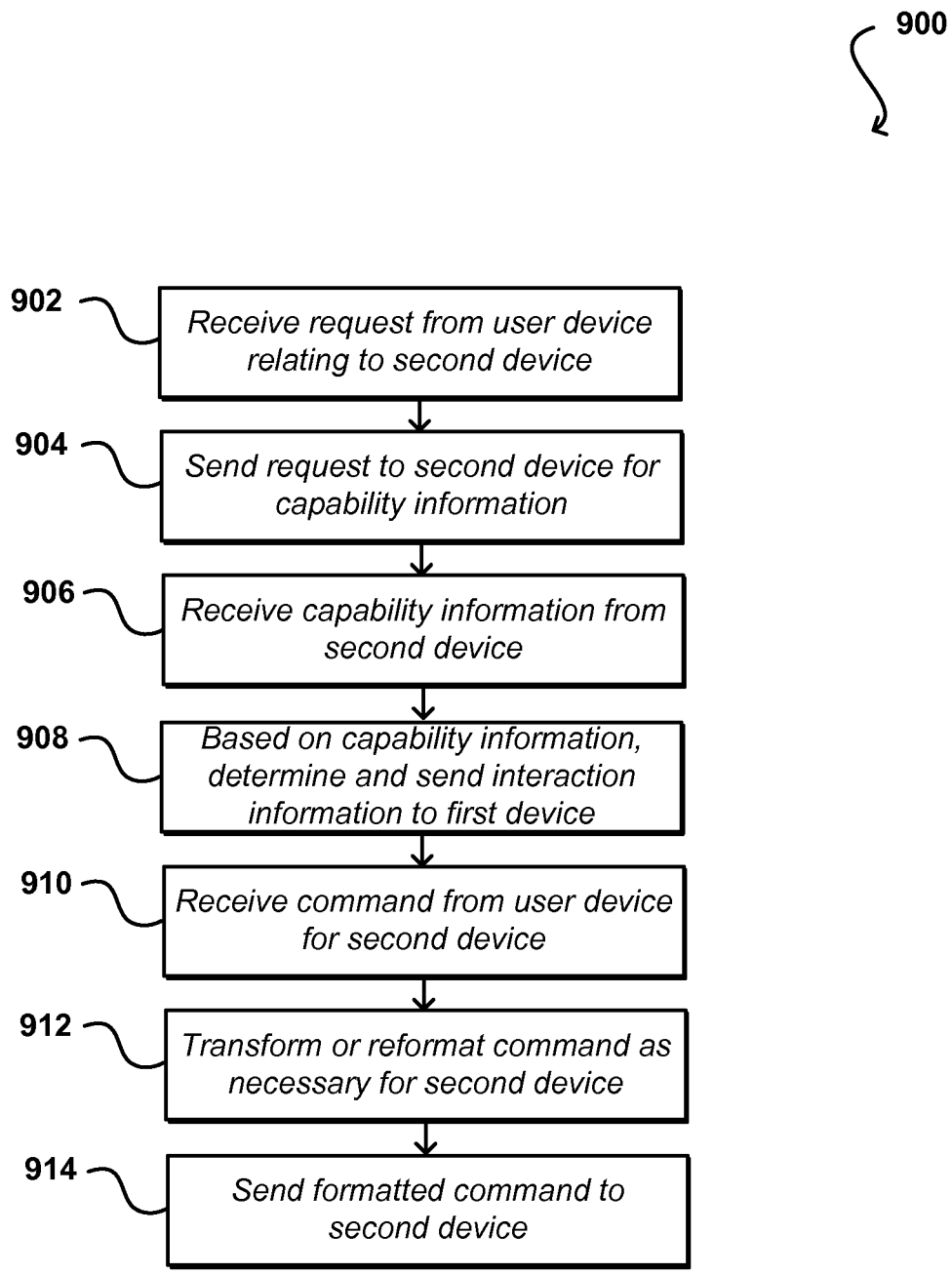
FIG. 9 illustrates an example process for enabling disparate devices to interact with each other in accordance with one embodiment.

FIG. 9 illustrates an example process 900 for enabling two devices to interact that can be utilized in accordance with various embodiments. In this example, a request is received from a user device to a cloud service (or similar system or service) 902. The request includes information associated with a specific second device, which can be a different type of device than the user device and may communicate using a different format and/or protocol. The cloud service can send a request to the second device for capability and other such information 904. If the device is registered with that cloud service, the service might have previously obtained the capability information and stored that information for subsequent use. Similarly, in at least some embodiments the cloud service also attempts to obtain capability and other such information for the user device as well, if not already available to the cloud service. The cloud service can receive capability information from the second device 906 in response to the request.

Based at least in part upon the capability information of the second device, the cloud service can send interaction information to the user device 908. As discussed, this can include any appropriate interaction information in any appropriate format, such as a file containing a list of available commands or a Web page with user-selectable elements enabling the user to submit certain commands to the second device via those elements. In some embodiments this information will be submitted in a format determined to be appropriate for the user device, and the cloud service can maintain a format mapping for the user and second devices if necessary. When the cloud service receives a command from the user device for the second device 910, where the commands are not sent directly to the second device, the cloud service can perform any transformation or reformatting of the command as necessary based upon the mappings or other such information 912, and can send the formatted command to the second device for processing 914. A similar approach can be used to send commands or requests from the second device to the user device as discussed elsewhere herein. Such a process enables any two appropriate devices to effectively be plug and play with respect to each other via the content management service or other such entity.

In some embodiments a system or service operating in the cloud can not only act as an intermediary between two unrelated devices, but can also enable the devices to run coordinated applications or other code or script. If each device is running certain software or at least able to speak certain protocols, the cloud device can create coordinated experiences across any number of devices of any appropriate type. In one example, a user with a cell phone could potentially answer that call using any other appropriate user device, such as a television, car stereo, alarm clock, etc. By knowing (or being able to determine) the capabilities of each device, the cloud device or service can also format the content in any appropriate manner, such as to convert a cell phone call into a voice chat or even video chat if the device has the appropriate capabilities. Any two devices which may have no inherent coordination and have never been tested together can work together automatically via the cloud with no manual configuration needed on behalf of the user(s).

A user can also associate certain devices to interact in certain ways via a cloud service. For example, a user might be configure a computing device to send text messages to the user's clock radio during the night. The clock radio might be able to forward alarm settings to the user's watch when the alarm is set. Because the cloud is able to map formats as necessary, content from a user's personal media player might also be able to be played on the clock radio, even where the media player plays files of a format that is not otherwise supported by the clock radio. Those media files might also be accessible from other devices, such as the user's car stereo, a television set, or any other device with an appropriate network connection able to speak an appropriate protocol or execute an appropriate application, etc. Such an approach thus enables devices to provide enhanced functionality, such as to enable a clock radio to play MP3 files (obtained and converted or mapped from another device), where that clock radio otherwise does not provide that functionality. Further, that functionality can be expanded to other locations or types of devices.

A user can also enable various devices to interact, at least to some extent, with any appropriate devices, such as friends' devices, devices in the workplace, or even devices in public places. Such interaction can be configurable by a user, such as to determine whether to enable other devices to obtain data, push data, or otherwise perform certain operations with respect to a user device. In some embodiments, a user must either request or grant access to each unknown device, at least for an initial interaction. A user might also specify a type of access for each unknown device. In addition to being able to send content, files, or applications to the other devices, such as to play the user's music on a stereo in a restaurant or store, the device also can be enabled to pull such content, such as to pull music from multiple friends' devices and generate a playlist that includes songs from each. A cloud service can also coordinate playback on multiple devices, such that if a group of friends are each watching video content on separate devices, the playback can be synchronized (even across different formats) such that each friend is seeing the same video content at substantially the same time. Various other types of interaction can be enabled as well, as should be apparent in light of the present disclosure.

In some embodiments, multiple devices can interact whereby the resulting action depends upon a consensus of those devices. For example, in a restaurant with multiple users suggesting channels for the main screen, the restaurant might show the channel that is voted on by the most user devices. In other embodiments, a store might play a type of music that appeals to most of the users in the store based upon information such as playlists stored on those users' devices. Similarly, the user devices can receive content based at least in part upon the capabilities and communication with a cloud service. For example, a device in a restaurant could have the menu pushed to the device, whereby the user can order using the device. A store could push coupons or specials to the user device. In a shoe store, a user device might be able to take a picture of a shoe and upload that information, along with the user's stored shoe size, to the store system to determine whether they have that item in the user's size, and request to be able to try on or purchase that shoe in the user's size. In a commercial, restaurant, or retail establishment, for example, a device can connect with a system for that establishment to enable the user to pay a bill using credit card information stored on, or captured by, the user device. Other services can take advantage of the capabilities of a user device as well, such as to check out of a hotel room or determine the state of a repair. And this functionality can be offered regardless of the type, format, or protocol of device, as long as a centralized service or similar entity is able to communicate with, and format content or instructions for, that device.

Further, the cloud can synchronize devices and enable those devices to provide functionality not possible using one of those devices alone. For example, a user might have a television, a tablet computer, and a voice recorder. If each of these devices is able to communicate with the cloud service, the capabilities of these devices can be combined to enable the user to perform a video chat with another user, which would not have been possible using any of these devices individually. If five users in a room have devices with mono speakers, the devices can be coordinated to each play a specific audio channel in order to provide a surround sound experience. In some embodiments, a user in a store looking at an electronic device can receive a message to the user device indicating additional functionality that will be available for the user device in the event the user buys the electronic device. For example, the user might be looking at an Internet-enabled car stereo. If the user device is able to detect this item, the user device can generate a notification for the user that the user will be able to obtain functionality such as playing music from the user device through the car stereo in a higher-quality format than is possible with the user device.

In some embodiments, a store system can access information (such as preference or purchase history information) from the user device and compare that with items in stock to attempt to suggest specific items to the user. In some cases, the system could suggest entire outfits based on preferences, current styles, the user's sizes, and other such information, and could potentially have those collections available to try on by the time the user gets to the dressing room (where the information could be sent to an employee's device to gather the pieces, etc.) In some cases, the user can see images of suggestions and can click a "like" or "dislike" button on the device for each suggestion, which can help the store system to improve its suggestions. Various other types of such interactions can be performed as well as should be apparent in light of the present disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of enabling devices to interact, comprising:
   under control of one or more computer systems configured with executable instructions,
   receiving a request from a first user device to interact with a plurality of user devices;
   in response to the request, determining one or more capabilities of at least one of the plurality of user devices utilizing at least one third party system storing the capability information for the at least one of the plurality of user devices;
   providing for display to the user on the first user device at least one command capable of being executed on the at least one of the plurality of user devices based at least in part upon the determined one or more capabilities, the provided display including a web page that provides at least one user-selectable element corresponding to the at least one command;
   maintaining state information for each of the first user device and the at least one of the plurality of user devices in order to execute coordinated applications across the first user device and the at least one of the plurality of user devices;
   receiving at least one command utilizing the at least one user-selectable element;
   changing at least one of a format or protocol of the received at least one command, based at least in part upon the determined one or more capabilities of the at least one of the plurality of user devices; and
   forwarding the command to the at least one of the plurality of user devices in the changed at least one format,
   whereby the first device is able to interact with the at least one of the plurality of user devices without having knowledge of the determined at least one format or the capabilities of the at least one of the at least one of the plurality of user devices.

2. The computer-implemented method of claim 1, wherein determining one or more capabilities of the at least one of the plurality of user devices includes contacting at least one third party system storing the capability information for the at least one of the plurality of user devices.

3. The computer-implemented method of claim 1, wherein determining one or more capabilities of the at least one of the plurality of user devices includes determining one or more commands capable of being received and executed by the at least one of the plurality of user devices.

4. The computer-implemented method of claim 1, wherein the one or more capabilities of the at least one of the plurality of user devices include at least one of processing capabilities, amount of memory, audio capabilities, video rendering capabilities, display capabilities, rate of power consumption, available battery life, available input mechanisms, available output mechanisms, data connection type, and peripheral information.

5. The computer-implemented method of claim 1, further comprising providing for display to the user on the first user device at least one command capable of being executed on the at least one of the plurality of user devices based at least in part upon the determined one or more capabilities of the at least one of the plurality of user devices.

6. The computer-implemented method of claim 1, wherein each user-selectable element causes a request to be sent to a communication service capable of changing a format or protocol of the request and sending the changed request to the at least one of the plurality of user devices.

7. The computer-implemented method of claim 1, wherein each user-selectable element causes a request to be sent to the at least one of the plurality of user devices, the request including information formatted for the at least one of the plurality of user devices as determined by a communication service having generated code for the web page based at least in part upon the one or more capabilities of the at least one of the plurality of user devices.

8. The computer-implemented method of claim 1, wherein the command is initially received by the at least one of the plurality of user devices, the at least one of the plurality of user devices forwarding information for the command to a communication service in order to change at least one of the format or protocol of the command to suit the at least one of the plurality of user devices.

9. The computer-implemented method of claim 1, wherein enabling the first device to interact with the plurality of user devices further enables the first device to combine the capabilities of the plurality of user devices with the capabilities of the first device.

10. The computer-implemented method of claim 1, further comprising synchronizing command execution on the plurality of user devices.

11. The computer-implemented method of claim 1, further comprising determining a resulting command based at least in part on a consensus of users of the plurality of user devices.

12. The computer-implemented method of claim 1, further comprising:
receiving an input command from a user of the first device;
determining whether the input command from the user is in a set of restricted input commands based at least in part on the user;
when the input command is in the set of restricted input commands, inhibiting further processing of the input command.

13. A system for enabling devices to interact, comprising:
a processor; and
memory including instructions that, when executed by the processor, cause the system to, at least:
receive a request from a first user device to interact with a plurality of user devices;
in response to the request, determine one or more capabilities of at least one of the plurality of user devices utilizing at least one third party system storing the capability information for the at least one of the plurality of user devices;
provide for display to the user on the first user device at least one command capable of being executed on the at least one of the plurality of user devices based at least in part upon the determined one or more capabilities, the provided display including a web page that provides at least one user-selectable element corresponding to the at least one command;
maintain state information for each of the first user device and the at least one of the plurality of user devices in order to execute coordinated applications across the first user device and the at least one of the plurality of user devices;
receive at least one command utilizing the at least one user-selectable element;
change at least one of a format or protocol of the received at least one command based at least in part upon the determined one or more capabilities of the at least one of the plurality of user devices; and
forward the command to the plurality of user devices in the changed at least one format or with the changed at least one protocol,
wherein the first device is able to interact with the at least one of the plurality of user devices without having knowledge of the determined at least one format or the capabilities of the at least one of the plurality of user devices.

14. The system of claim 13, wherein determining one or more capabilities of the at least one of the plurality of user devices includes determining one or more commands capable of being received and executed by the plurality of user devices.

15. The system of claim 13, wherein the instructions when executed further cause the system to provide for display to the user on the first user device at least one command capable of being executed on the plurality of user devices based at least in part upon the determined one or more capabilities of the at least one of the plurality of user devices.

16. The system of claim 13, wherein the instructions when executed further cause the system to maintain state information for each of the first user device and the plurality of user devices suited to executing coordinated applications across the first user device and the plurality of user devices.

17. A computer-implemented method of enabling devices with different capabilities to interact, comprising:
under control of one or more computer systems configured with executable instructions,
receiving a request for format or protocol translation from a first electronic device, wherein the request for format or protocol translation is associated with an interaction request between the first electronic device and at least one of a plurality of electronic devices;
in response to the request, obtaining capability information for the at least one of the plurality of electronic devices utilizing at least one third party system storing the capability information for the at least one of the plurality of electronic devices;
providing for display to the user on the first electronic device at least one command capable of being executed on the at least one of the plurality of electronic devices based at least in part upon the determined one or more capabilities, the provided display including a web page that provides at least one user-selectable element corresponding to the at least one command;
maintaining state information for each of the first electronic device and the at least one of the plurality of electronic devices in order to execute coordinated applications across the first electronic device and the at least one of the plurality of electronic devices;
receiving at least one command utilizing the at least one user-selectable element;
changing at least one of a format or protocol of the interaction request to a format or protocol recognizable by the intended receiver of the interaction request based at least in part on the capability information of the at least one of the electronic devices; and
sending the changed interaction request to the at least one of the plurality of electronic devices,
wherein the first electronic device is able to interact with the at least one of the plurality of electronic devices without having knowledge of the format or protocol of the at least one of the plurality of electronic devices.

18. The computer-implemented method of claim 17, wherein the first and the at least one of the plurality of electronic devices are associated with different users.

19. A non-transitory computer-readable storage medium including instructions that, when executed by one or more computers, cause the one or more computers to, at least:
receive a request for translation of a command from a first electronic device, wherein the request for translation is associated with an interaction request between the first electronic device and at least one of a plurality of electronic devices;
determine one or more capabilities of the first electronic device;
in response to the request, determine one or more capabilities of the at least one of a plurality of the electronic devices utilizing at least one third party system storing the capability information for the at least one of the plurality of electronic devices;
provide for display to the user on the first electronic device at least one command capable of being executed on the at least one of the plurality of electronic devices based at least in part upon the determined one or more capabilities, the provided display including a web page that provides at least one user-selectable element corresponding to the at least one command;

maintain state information for each of the first electronic device and the at least one of the plurality of electronic devices in order to execute coordinated applications across the first electronic device and the at least one of the plurality of electronic devices;

receiving at least one command utilizing the at least one user-selectable element;

change the command to a format or protocol recognizable by the first electronic device based at least in part on the one or more capabilities of the first electronic device and the one or more capabilities of the at least one of the plurality of electronic devices; and send the command to the first electronic device, whereby the at least one of the plurality of electronic devices are able to interact with the first electronic device without having knowledge of the determined one or more capabilities of the at least one of the plurality of electronic devices.

20. The non-transitory computer-readable storage medium of claim 19, wherein determining one or more capabilities of the first electronic device includes determining one or more commands capable of being received and executed by the first electronic device.

* * * * *

UNITED STATES PATENT AND TRADEMARK OFFICE
CERTIFICATE OF CORRECTION

PATENT NO. : 8,606,948 B2  
APPLICATION NO. : 12/889888  
DATED : December 10, 2013  
INVENTOR(S) : Ethan Z. Evans et al.

Page 1 of 1

It is certified that error appears in the above-identified patent and that said Letters Patent is hereby corrected as shown below:

In the Claims Section,

Claim 1, column 28, line 17, please delete "of the at least one of the at least one of the plurality of user devices."

and insert -- of the at least one of the plurality of user devices. --

Signed and Sealed this  
Twenty-seventh Day of May, 2014

Michelle K. Lee  
*Deputy Director of the United States Patent and Trademark Office*